US010305689B2

(12) United States Patent
Araki

(10) Patent No.: US 10,305,689 B2
(45) Date of Patent: May 28, 2019

(54) ENCRYPTION APPARATUS, DECRYPTION APPARATUS, CRYPTOGRAPHY PROCESSING SYSTEM, ENCRYPTION METHOD, DECRYPTION METHOD, ENCRYPTION PROGRAM, AND DECRYPTION PROGRAM

(71) Applicant: NEC Corporation, Minato-ku, Tokyo (JP)

(72) Inventor: Toshinori Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 58 days.

(21) Appl. No.: 15/532,147

(22) PCT Filed: Oct. 13, 2015

(86) PCT No.: PCT/JP2015/078908
§ 371 (c)(1),
(2) Date: Jun. 1, 2017

(87) PCT Pub. No.: WO2016/088453
PCT Pub. Date: Jun. 9, 2016

(65) Prior Publication Data
US 2017/0272243 A1 Sep. 21, 2017

(30) Foreign Application Priority Data
Dec. 4, 2014 (JP) .................... 2014-245932

(51) Int. Cl.
*H04L 9/08* (2006.01)
*G09C 1/00* (2006.01)
(Continued)

(52) U.S. Cl.
CPC ............. *H04L 9/0861* (2013.01); *G09C 1/00* (2013.01); *H04L 9/06* (2013.01); *H04L 9/0637* (2013.01); *H04L 9/14* (2013.01)

(58) Field of Classification Search
CPC ....... H04L 9/06; H04L 9/0637; H04L 9/0861; H04L 9/14; G09C 1/00
See application file for complete search history.

(56) References Cited

U.S. PATENT DOCUMENTS 5,870,470 A 2/1999 Johnson et al.
7,418,100 B2 * 8/2008 McGrew ................ H04L 9/002
380/28
(Continued)

FOREIGN PATENT DOCUMENTS

JP 2006-311383 A 11/2006

OTHER PUBLICATIONS

Anand Desai, "The Security of All-or-Nothing Encryption: Protecting against Exhaustive Key Search", Lecture Notes in Computer Science, Department of Computer Science & Engineering, University of California at San Diego, vol. 1880, Aug. 11, 2000, p. 359-375.
(Continued)

Primary Examiner — Brian F Shaw

(57) ABSTRACT

An acquisition unit (2020) acquires a plaintext block sequence and a first cryptographic key. The plaintext block sequence is constituted by a plurality of plaintext blocks. A second-cryptographic-key generation unit (2040) generates a second cryptographic key. A third-cryptographic-key generation unit (2060) generates a third cryptographic key. The third cryptographic key is calculated as exclusive OR between the first cryptographic key and a portion or the entirety of the second cryptographic key. A counter mode encryption unit (2080) encrypts the plaintext block sequence using the third cryptographic key as a cryptographic key, and generates a cryptographic block sequence. A block cryptography using a counter mode as block cipher mode of operation is used in encryption. A key block generation unit (2100) generates a key block. The key block is calculated as
(Continued)

US 10,305,689 B2

Page 2 exclusive OR between the second cryptographic key and respective blocks of the cryptographic block sequence.

10 Claims, 15 Drawing Sheets

(51) Int. Cl.
*H04L 9/06* (2006.01)
*H04L 9/14* (2006.01)

(56) References Cited

U.S. PATENT DOCUMENTS

| | | | | |
|---|---|---|---|---|
| 7,577,851 B2* | 8/2009 | Inamura | ............... | G06F 12/145 |
| | | | | 380/264 |
| 2002/0172359 A1* | 11/2002 | Saarinen | ................ | G06F 7/588 |
| | | | | 380/46 |
| 2005/0201554 A1* | 9/2005 | Kramer | ................... | H04L 9/12 |
| | | | | 380/28 |

OTHER PUBLICATIONS

Ghassan O. Karame et al., "Securing Cloud Data in the New Attacker Model", Cryptology ePrint Archive, Report 2014/556, Jul. 16, 2014. URL: http://eprint.iacr.org/2014/556.

Mihir Bellare and Alexandra Boldyreva, "The Security of Chaffing and Winnowing", Lecture Notes in Computer Science, Department of Computer Science & Engineering, University of California at San Diego, vol. 1976, 2000, p. 517-530.

Hidenori Kuwakado, Hatsukazu Tanaka, "Strongly Non-Separable Encryption Mode for Throwing a Media Away", IEICE Technical Report, vol. 103, No. 417, Nov. 7, 2003, pp. 15-18.

International Search Report for PCT Application No. PCT/JP2015/078908, dated Jan. 19, 2016.

* cited by examiner

FIG. 2

<FLOW OF CIPHERTEXT GENERATION PROCESS EXECUTED BY ENCRYPTION APPARATUS 2000>

(1) ACQUIRE FIRST CRYPTOGRAPHIC KEY ke1 OF L BITS AND PLAINTEXT BLOCK SEQUENCE $x[1],...,x[n]$ (2) CALCULATE SECOND CRYPTOGRAPHIC KEY ke2 HAVING SAME SIZE AS THAT OF PLAINTEXT BLOCK (3) CALCULATE $k = ke2 \bmod 2^L$ (4) CALCULATE THIRD CRYPTOGRAPHIC KEY $ke3 = ke1 \oplus k$ (5) CALCULATE CRYPTOGRAPHIC BLOCK SEQUENCE
$y[1], y[2],..., y[n] = EncCtr(ke3; i; x[1],..., x[n])$ (6) CALCULATE KEY BLOCK $y[n+1] = ke2 \oplus y[1] \oplus y[2] \oplus ... \oplus y[n]$ (7) OUTPUT $y[1],..., y[n], y[n+1]$

FIG. 6  RELATED ART

<FLOW OF CIPHERTEXT GENERATION PROCESS EpIsAenc ( )>

(1) ACQUIRE KEY k OF L BITS, COUNTER ctr, AND PLAINTEXT BLOCK SEQUENCE x[ 1 ],..., x[ n ]

(2) CALCULATE x'[ 1 ],...x'[ n+1 ] = AONTenc(x[ 1 ],..., x[ n ])

(3) CALCULATE y[ i ] = Enc(k; x'[ i ]), $1 \leq i \leq n$ (4) CALCULATE y[ 1 ],..., y[ n ] AS CIPHERTEXT <<FLOW OF AONTenc ( )>>

(1) GENERATE RANDOM DATA k' HAVING SAME SIZE AS BLOCK LENGTH (2) CALCULATE k = k' mod $2^L$ (3) CALCULATE x'[ 1 ],..., x'[ n ] = EncCtr(k; 0; x[ 1 ],... x[ n ])

(4) CALCULATE x'[ n+1 ] = k'⊕x'[ 1 ]⊕ ...⊕x'[ n ]

(5) OUTPUT x'[ 1 ],..., x'[ n+1 ]

FIG. 7    RELATED ART

<FLOW OF DECRYPTION PROCESS EpIsAdec ( )>

(1) ACQUIRE KEY k OF L BITS AND CIPHERTEXT y[ 1 ],..., y[ n+1 ]

(2) CALCULATE x'[ i ] = Dec(k; y[ i ]), $1 \leq i \leq n$ (3) CALCULATE x[ 1 ],... x[ n ] = AONTdec(x'[ 1 ],..., x'[ n+1 ])

(4) OUTPUT PLAINTEXT BLOCK SEQUENCE x[ 1 ],..., x[ n ]

<<FLOW OF AONTdec ( )>>

(1) CALCULATE k' = x'[ 1 ] $\oplus$ ... $\oplus$ x'[ n+1 ]

(2) CALCULATE k = k' mod $2^L$ (3) CALCULATE x[ 1 ],..., x[ n ] = DecCtr(k; 0; x'[ 1 ],..., x'[ n ])

(4) OUTPUT x[ 1 ],..., x[ n ]

FIG. 8 RELATED ART

<FLOW OF CIPHERTEXT GENERATION PROCESS AONEenc ( )>

(1) ACQUIRE KEY k OF L BITS AND PLAINTEXT BLOCK SEQUENCE x[ 1 ],..., x[ n ]

(2) GENERATE RANDOM DATA y'[ n+1 ] HAVING SAME SIZE AS BLOCK LENGTH (3) CALCULATE y'[ 1 ],..., y'[ n ] = EncCtr(k; y'[ n+1 ]; x[ 1 ],..., x[ n ])

(4) CALCULATE t = y'[ 1 ]⊕y'[ 2 ]⊕ ... ⊕y'[ n+1 ]

(5) CALCULATE y[ i ] = y'[ i ]⊕t, 1 ≤ i ≤ n+1

(6) OUTPUT y[ 1 ],..., y[ n ], y[ n+1 ]

FIG. 9  RELATED ART

<FLOW OF DECRYPTION PROCESS AONEdec ( )>

(1) ACQUIRE KEY k AND BLOCK SEQUENCE y[ 1 ],..., y[ n ], y[ n+1 ]

(2) CALCULATE t = y[ 1 ] ⊕ y[ 2 ] ⊕ ... ⊕ y[ n ] ⊕ y[ n+1 ]

(3) CALCULATE y'[ i ] = y[ i ] ⊕ t, 1 ≤ i ≤ n+1

(4) CALCULATE x[ 1 ], x[ 2 ],..., x[ n ] = DecCtr(k; y'[ n+1 ]; y'[ 1 ],..., y'[ n ])

(5) OUTPUT PLAINTEXT BLOCK SEQUENCE x[ 1 ],..., x[ n ]

FIG. 11

<FLOW OF DECRYPTION PROCESS EXECUTED BY DECRYPTION APPARATUS 3000>

(1) ACQUIRE FIRST DECRYPTION KEY kd1 OF L BITS AND TARGET BLOCK SEQUENCE
    y[ 1 ],..., y[ n ], y[ n+1 ]

(2) CALCULATE SECOND DECRYPTION KEY kd2 = y[ 1 ]⊕y[ 2 ]⊕ ... ⊕y[ n ]⊕y[ n+1 ]

(3) CALCULATE k = kd2 mod $2^L$ (4) CALCULATE THIRD DECRYPTION KEY kd3 = kd1⊕k (5) CALCULATE PLAINTEXT BLOCK SEQUENCE
    x[ 1 ], x[ 2 ],..., x[ n ] = DecCtr(kd3; i; y[ 1 ],..., y[ n ])

(6) OUTPUT PLAINTEXT BLOCK SEQUENCE x[ 1 ],..., x[ n ]

ENCRYPTION APPARATUS, DECRYPTION APPARATUS, CRYPTOGRAPHY PROCESSING SYSTEM, ENCRYPTION METHOD, DECRYPTION METHOD, ENCRYPTION PROGRAM, AND DECRYPTION PROGRAM

This application is a National Stage Entry of PCT/JP2015/078908 filed on Oct. 13, 2015, which claims priority from Japanese Patent Application 2014-245932filed on Dec. 4, 2014, the contents of all of which are incorporated herein by reference, in their entirety.

TECHNICAL FIELD

The present invention relates to block cryptography.

BACKGROUND ART

There is block cryptography as one of cryptosystems. The block cryptography is classified as a common key cryptosystem in which the same key is used in encryption and decryption. The block cryptography is constituted by an encryption process and a decryption process. In the encryption process, a ciphertext is output using a target data for encryption (plaintext) and a key as an input. In the decryption process, plaintext is output using the ciphertext and the key as an input.

In the block cryptography, a key length and a block length are fixed. For example, in the common key cryptosystem AES, which is standardized by National Institute of Standards and Technology (NIST), the key length can be selected from 128 bits, 192 bits, and 256 bits, and the block length is 128 bits.

In a case where data larger than the block length is handled using the block cryptography, for example, the data is divided into a plurality of blocks, and encryption and decryption are performed for each block. Methods of using the block cryptography for handling data larger than a block length in this manner is called block cipher modes of operation.

Here, in a method of encrypting each block, when a portion of the ciphertext and the key are acquired, the acquired portions can be decrypted. Therefore, in order to prevent a portion of the ciphertext from being decrypted, a technique called All Or Nothing Transform (AONT) is used. A method of performing encryption and decryption using AONT is disclosed in, for example, Non-Patent Document 1 and Non-Patent Document 2.

RELATED DOCUMENTS

Non-Patent Documents

[Non-Patent Document 1] Anand Desai, "The Security of All-or-Nothing Encryption: Protecting against Exhaustive Key Search", Advances in Cryptology(CRYPTO 2000), Aug. 11, 2000, pp. 359-375

[Non-Patent Document 2] Ghassan O. Karame, and Three Others, "Securing Cloud Data in the New Attacker Model", [online], Jul. 16, 2014, [Search on Oct. 30, 2014], Internet <URL: https://eprint.iacr.org/2014/556.pdf>

SUMMARY OF THE INVENTION

In the method of Non-Patent Document 1, when plaintext of n blocks is input, ciphertext of n+1 blocks is output. As long as the entirety of the ciphertext of n+1 blocks is not able to be acquired, even a portion of the plaintext is not able to be decrypted. However, the amount of calculation of its cryptographic processing (encryption process and decryption process) is more than that in the method of Non-Patent Document 2.

On the other hand, in the method of Non-Patent Document 2, the ciphertext of n+1 blocks can be output from the plaintext of n blocks by the smaller amount of calculation than that in the method of Non-Patent Document 1. However, since a portion of the plaintext can be decrypted when n blocks within the ciphertext of n+1 blocks can be acquired, the method of Non-Patent Document 2 is lower in safety than the method of Non-Patent Document 1.

The present invention is contrived in view of the above problems. An object of the present invention is to provide a technique for performing cryptographic processing with a small amount of calculation while improving the safety of ciphertext in block cryptography.

According to the present invention, there is provided an encryption apparatus including: an acquisition unit acquiring a plaintext block sequence constituted by a plurality of plaintext blocks, and a first cryptographic key; a second-cryptographic-key generation unit generating a second cryptographic key; a third-cryptographic-key generation unit calculating a third cryptographic key as exclusive OR between the first cryptographic key and a portion or the entirety of the second cryptographic key; a counter mode encryption unit encrypting the plaintext block sequence with a block cryptography of a counter mode in which the third cryptographic key is used as a cryptographic key, and generating a cryptographic block sequence; and a key block generation unit generating a key block by calculating exclusive OR between the second cryptographic key and respective blocks of the cryptographic block sequence.

According to the present invention, there is provided a decryption apparatus including: an acquisition unit acquiring a key block, a cryptographic block sequence having a plurality of cryptographic blocks, and a first decryption key; a second-decryption-key generation unit calculating exclusive OR between respective cryptographic blocks included in the cryptographic block sequence, and generates a second decryption key using a result of the calculation; a third-decryption-key generation unit calculating a third decryption key as exclusive OR between the first decryption key and a portion or the entirety of the second decryption key; and a counter mode decryption unit decrypting the cryptographic block sequence with a block cryptography of a counter mode in which the third decryption key is used as a decryption key, and generating a plaintext block sequence.

According to the present invention, there is provided a cryptography processing system includes the encryption apparatus and the decryption apparatus which are provided by the present invention.

An encryption method which is provided by the present invention is executed by a computer. The encryption method includes: an acquisition step of acquiring a plaintext block sequence constituted by a plurality of plaintext blocks, and a first cryptographic key; a second-cryptographic-key generation step of generating a second cryptographic key; a third-cryptographic-key generation step of calculating a third cryptographic key as exclusive OR between the first cryptographic key and a portion or the entirety of the second cryptographic key; a counter mode encryption step of encrypting the plaintext block sequence with a block cryptography of a counter mode in which the third cryptographic key is used as a cryptographic key, and generating a cryptographic block sequence; and a key block generation step of generating a key block by calculating exclusive OR between the second cryptographic key and respective blocks of the cryptographic block sequence.

A decryption method which is provided by the present invention is executed by a computer. The decryption method includes: an acquisition step of acquiring a key block, a cryptographic block sequence having a plurality of cryptographic blocks, and a first decryption key; a second-decryption-key generation step of calculating exclusive OR between respective cryptographic blocks included in the cryptographic block sequence, and generating a second decryption key using a result of the calculation; a third-decryption-key generation step of calculating a third decryption key as exclusive OR between the first decryption key and a portion or the entirety of the second decryption key; and a counter mode decryption step of decrypting the cryptographic block sequence with a block cryptography of a counter mode in which the third decryption key is used as a decryption key, and generating a plaintext block sequence.

An encryption program which is provided by the present invention causes a computer to have a function of operating as the encryption apparatus which is provided by the present invention.

A decryption program which is provided by the present invention causes a computer to have a function of operating as the decryption apparatus which is provided by the present invention.

According to the present invention, it is possible to provide a technique for performing cryptographic processing with a small amount of calculation while improving the safety of ciphertext in block cryptography.

BRIEF DESCRIPTION OF THE DRAWINGS

The above and other objects, features and advantages will be made clearer from certain preferred embodiments described below, and the following accompanying drawings.

FIG. 2 is a diagram illustrating a process executed by the encryption apparatus using mathematical expressions and the like.

FIG. 6 is a diagram illustrating an encryption process in Non-Patent Document 1.

FIG. 7 is a diagram illustrating a decryption process in Non-Patent Document 1.

FIG. 8 is a diagram illustrating an encryption process in Non-Patent Document 2.

FIG. 9 is a diagram illustrating a decryption process in Non-Patent Document 2.

FIG. 11 is a diagram illustrating a process executed by the decryption apparatus using mathematical expressions and the like.

DESCRIPTION OF EMBODIMENTS

Figure 1:
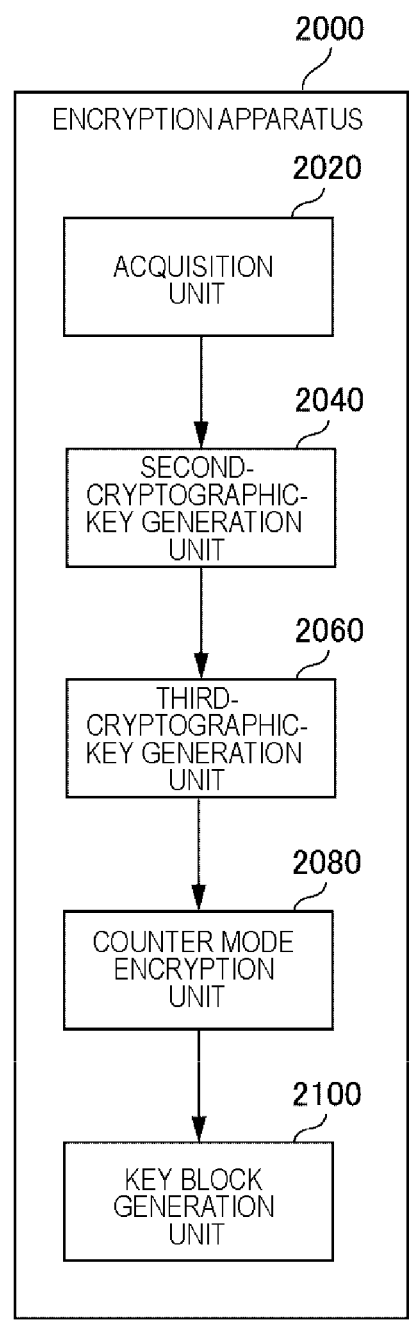
FIG. 1 is a block diagram illustrating an encryption apparatus according to Exemplary Embodiment 1.

Hereinafter, an embodiment of the present invention will be described with reference to the accompanying drawings. In all the drawings, like elements are referenced by like reference numerals and the descriptions thereof will not be repeated.

[Exemplary Embodiment 1]

FIG. 1 is a block diagram illustrating an encryption apparatus 2000 according to Exemplary Embodiment 1. In FIG. 1, arrows indicate a flow of information. Further, in FIG. 1, each block represents a function-based configuration rather than a hardware-based configuration.

The encryption apparatus 2000 includes an acquisition unit 2020, a second-cryptographic-key generation unit 2040, a third-cryptographic-key generation unit 2060, a counter mode encryption unit 2080, and a key block generation unit 2100.

The acquisition unit 2020 acquires a plaintext block sequence and a first cryptographic key. The plaintext block sequence is constituted by a plurality of plaintext blocks. The second-cryptographic-key generation unit 2040 generates a second cryptographic key. The third-cryptographic-key generation unit 2060 generates a third cryptographic key. The third cryptographic key is calculated as exclusive OR between the first cryptographic key and a portion or the entirety of the second cryptographic key. The counter mode encryption unit 2080 encrypts the plaintext block sequence using the third cryptographic key as a cryptographic key, and generates a cryptographic block sequence. The encryption uses a block cryptography that uses counter mode as its block cipher mode of operation. The key block generation unit 2100 generates a key block. The key block is calculated as exclusive OR between the second cryptographic key and respective blocks of the cryptographic block sequence.

FIG. 2 is a diagram illustrating a process executed by the encryption apparatus 2000 using mathematical expressions and the like. Hereinafter, the function of each functional configuration unit will be described with appropriate reference to FIG. 2. However, the process shown in FIG. 2 is merely illustrative, and the process executed by the encryption apparatus 2000 is not limited to the process shown in FIG. 2. In addition, in the example of FIG. 2, it is assumed that the key length L of the first cryptographic key is larger than the block length of plaintext blocks. However, the key length L of the first cryptographic key may be equal to or less than the block length of the plaintext blocks.

<Acquisition Unit 2020>

A process performed by the acquisition unit 2020 is represented by, for example, (1) of FIG. 2. Here, there are various methods in which the acquisition unit 2020 acquires the first cryptographic key and the plaintext block sequence. For example, the acquisition unit 2020 acquires the first cryptographic key and the plaintext block sequence that are input from an external apparatus. In another example, the acquisition unit 2020 acquires the first cryptographic key and the plaintext block sequence that are manually input. Further, the acquisition unit 2020 may have access to the external apparatus, and acquire the first cryptographic key and the plaintext block sequence. Further, the acquisition unit 2020 may acquire the first cryptographic key and the plaintext block sequence using different methods. For example, the first cryptographic key is acquired from the external apparatus, and the plaintext block sequence is manually input.

<Second-Cryptographic-Key Generation Unit 2040>

There are various methods in which the second-cryptographic-key generation unit 2040 generates the second cryptographic key. For example, the second-cryptographic-key generation unit 2040 generates a random bit sequence having a predetermined bit length, and handles this bit sequence to the second cryptographic key. In another example, a plurality of candidates of the second cryptographic key are prepared, and the second-cryptographic-key generation unit 2040 may select a second cryptographic key to be used from the candidates. Note that, the above-described "predetermined bit length" may be set in the second-cryptographic-key generation unit 2040 in advance, or may be acquired by the second-cryptographic-key generation unit 2040 from a storage apparatus or the like that stores the predetermined bit length.

A process performed by the second-cryptographic-key generation unit 2040 is, for example, represented by (2) of FIG. 2. In (2) of FIG. 2, the key length ("predetermined bit length" described above) of the second cryptographic key is equal to the block length of the plaintext block. However, the key length of the second cryptographic key may be different from the block length of the plaintext block.

<Third-Cryptographic-Key Generation Unit 2060>

As described above, the third-cryptographic-key generation unit 2060 generates the third cryptographic key as exclusive OR between the first cryptographic key and a portion or the entirety of the second cryptographic key.

In a case where the bit length of the second cryptographic key is larger than the bit length of the first cryptographic key, the third-cryptographic-key generation unit 2060 calculates exclusive OR between the first cryptography and a portion of the second cryptographic key. For example, this process is represented by (3) and (4) of FIG. 2. In FIG. 2, the block length of the plaintext block is larger than the key length L of the first cryptographic key. Therefore, the third-cryptographic-key generation unit 2060 calculates the lowest L bits of the second cryptographic key ke2 through the process of (3) FIG. 2, and handles this value as k. In (4) of FIG. 2, the third-cryptographic-key generation unit 2060 calculates exclusive OR between of the first cryptographic key ke1 having L bits and k being the lowest L bits of the second cryptographic key, and thus calculates the third cryptographic key ke3.

Note that, in a case where the bit length of the second cryptographic key is equal to or less than the bit length of the first cryptographic key, the process of (3) of FIG. 2 is not required.

<Counter Mode Encryption Unit 2080>

The counter mode encryption unit 2080 encrypts a plurality of plaintext blocks using the counter mode, which is one of block cipher modes of operation. Here, in the block cryptography of the counter mode, a cryptographic block sequence is generated using a cryptographic key, the initial value of a counter, and a plaintext block sequence which is a target for encryption as an input.

The counter mode encryption unit 2080 uses the above-described third cryptographic key as the cryptographic key. In addition, the counter mode encryption unit 2080 uses the plaintext block sequence acquired by the acquisition unit 2020, as the plaintext block sequence that is a target for encryption. Further, the counter mode encryption unit 2080 uses, for example, 0 as the initial value of the counter. However, the initial value of the counter may be any value, and is not limited to 0.

Here, the method itself of performing encryption with the block cryptography of the counter mode using the input cryptographic key, the initial value of the counter, and the plaintext block sequence is an existing technique. Therefore, the detailed description of this method will not be repeated.

A process performed by the counter mode encryption unit 2080 is represented by, for example, (5) of FIG. 2. Here, $EncCtr(ke3 ; i; x[1], \ldots, x[n])$ indicates a "function of performing encryption with the block cryptography of the counter mode, using the cryptographic key ke3, the initial value i of the counter, and the plaintext block sequence $\{x[1], \ldots, x[n]\}$ as an input". In (5) of FIG. 2, $\{y[1], \ldots, y[n]\}$ is generated as the cryptographic block sequence.

<Key Block Generation Unit 2100>

The key block generation unit 2100 generates a key block as the exclusive OR between the second cryptographic key and respective blocks of the cryptographic block sequence. This process is represented by, for example, (6) of FIG. 2. In (6) of FIG. 2, $y[n+1]$ indicates a key block. In this manner, the second cryptographic key is masked by the cryptographic block sequence.

Here, in a case where the bit length of the second cryptographic key is larger than the bit length of each cryptographic block, a portion of the second cryptographic key is not masked if the exclusive OR between the second cryptographic key as it is and each cryptographic block is calculated. Therefore, for example, the key block generation unit 2100 generates a plurality of key blocks by dividing the second cryptographic key into a plurality of partial keys and performing exclusive OR operations between respective ones of partial keys and the cryptographic block sequence. In this manner, the entirety of the second cryptographic key is masked by the cryptographic block sequence.

Figure 3:
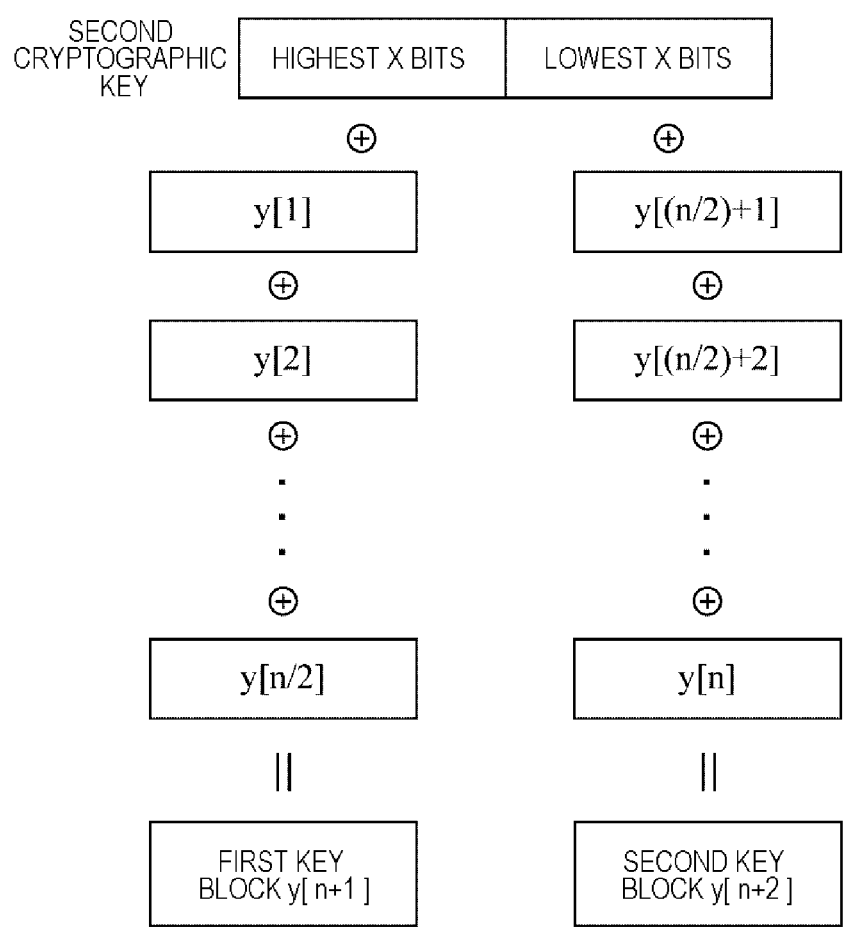
FIG. 3 is a diagram conceptually illustrating a method in which a key block generation unit generates a plurality of key blocks.

FIG. 3 is a diagram conceptually illustrating a method in which the key block generation unit 2100 generates a plurality of key blocks. In FIG. 3, the key length of the second cryptographic key is twice the block length of the cryptographic block. Here, the block length of the cryptographic block is set to X. For example, the key block generation unit 2100 equally divides the second cryptographic key into two parts, and generates a partial key kp1 constituted by the highest X bits and a partial key kp2 constituted by the lowest X bits.

Then, the key block generation unit 2100 equally divides the cryptographic block sequence into two parts, and generates a first key block using one of the block sequences and the partial key kp1. In addition, the key block generation unit 2100 generates a second key block using the other one of block sequences and the partial key kp2. Specifically, the key block generation unit 2100 calculates exclusive OR between the partial key kp1 and respective blocks included in the block sequence $\{y[1], \ldots, y[n/2]\}$, and handles the calculated value as the first key block. Further, the key block generation unit 2100 calculates exclusive OR between the partial key kp2 and respective blocks included in the block sequence $\{y[(n/2)+1], \ldots, y[n]\}$, and handles the calculated value as the second key block.

<As for Other Functions>

The encryption apparatus 2000 may further include an output unit 2120 (not shown). The output unit 2120 outputs a cryptographic block sequence and a key block. For example, the output unit 2120 outputs the block sequence constituted by the cryptographic block sequence (hereinafter, output block sequence) and the key block. A process performed by the output unit 2120 is represented by, for example, (7) of FIG. 2. In (7) of FIG. 2, the output block sequence is a block sequence {y[1], . . . , y[n], y[n+1] } in which the cryptographic block sequence {y[1], . . . , y[n]} and the key block y[n+1] are coupled to each other. However, the output unit 2120 may separately output the cryptographic block sequence and the key block.

Note that, in a case where a plurality of key blocks are generated, the output unit 2120 outputs all the generated key blocks. For example, in a case of the example of FIG. 3, the output unit 2120 outputs the cryptographic block sequence {y[1], . . . , y[n]}, and the key blocks y[n+1] and y[n+2].

There are various methods of using the cryptographic block sequence and the key block output by the output unit 2120. For example, the cryptographic block sequence and the key block output by the output unit 2120 are recorded in a storage unit, which may be provided inside or outside the encryption apparatus 2000. Thereafter, the cryptographic block sequence and the key block recorded in the storage unit are acquired by an apparatus that performs a decryption process of the cryptographic block sequence (for example, decryption apparatus 3000 described later). In addition, the output unit 2120 may transmit the cryptographic block sequence and the key block to the outside.

Note that the cryptographic block sequence and the key block may be stored in different storage units. In addition, each block included in the cryptographic block sequence may be stored in different storage units. For example, the output block sequence is divided into m (m>0) block sequences, and the block sequences after the division are stored in different storage devices, respectively. In this manner, the output block sequence is divided into a plurality of parts and is stored in different storage devices, respectively. Thereby, it is possible to lower the probability of a malicious third party acquiring all of the cryptographic block sequences and the key blocks.

In addition, the output block sequence may be made redundant by a redundancy method such as RAID or multiplexing, and may be stored in a storage device. Further, the output block sequence made redundant may be divided into a plurality of block sequences, and the divided block sequences may be stored in different storage devices, respectively.

<Flow of Processes>

Figure 4:
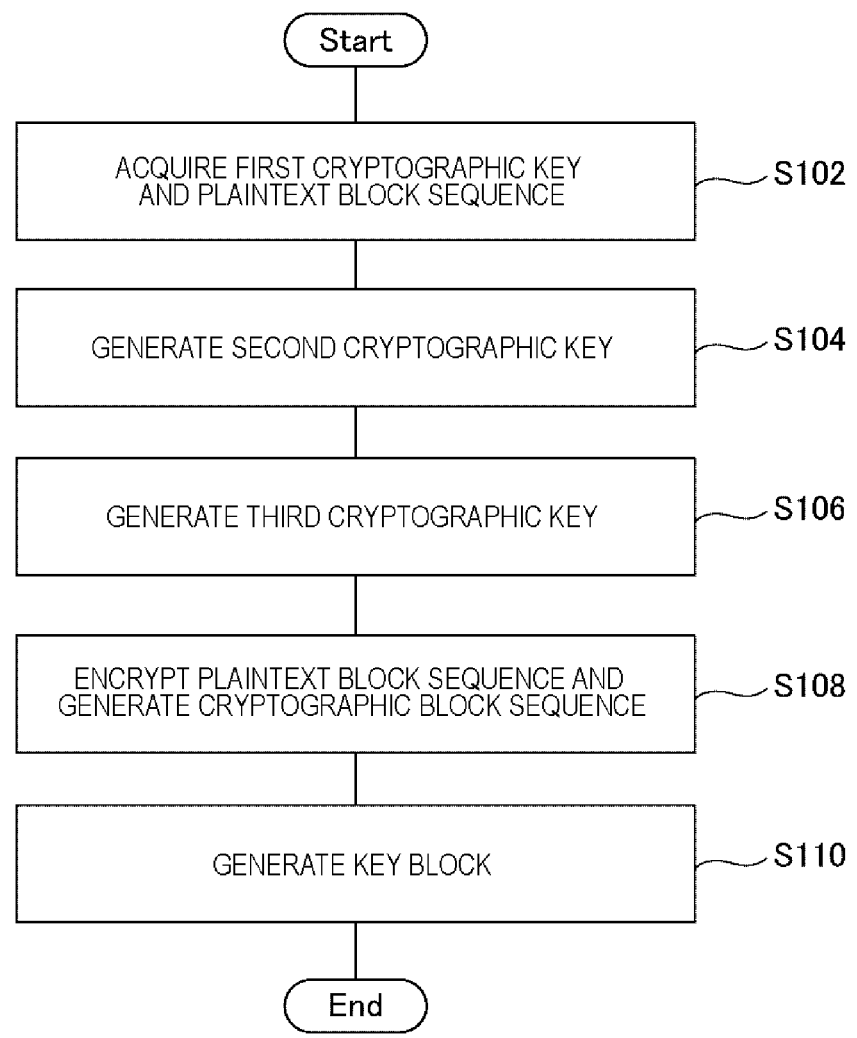
FIG. 4 is a flow diagram illustrating a flow of processes executed by the encryption apparatus of Exemplary Embodiment 1.

FIG. 4 is a flow diagram illustrating a flow of processes executed by the encryption apparatus 2000 of Exemplary Embodiment 1. The acquisition unit 2020 acquires the plaintext block sequence and the first cryptographic key (S102). The second-cryptographic-key generation unit 2040 generates the second cryptographic key (S104). The third-cryptographic-key generation unit 2060 generates the third cryptographic key (S106). The counter mode encryption unit 2080 uses the third cryptographic key as the cryptographic key to encrypt the plaintext block sequence with the block cryptography of the counter mode, and generates the cryptographic block sequence (S108). The key block generation unit 2100 generates the key block (S110).

<Hardware Configuration Example>

Each functional configuration unit of the encryption apparatus 2000 may be realized by hardware for realizing each functional configuration unit (such as, for example, a hardwired electronic circuit), or may be realized by a combination of hardware and software (such as, for example, combination of an electronic circuit and a program for controlling the electronic circuit). Hereinafter, configurations in a case where each functional configuration unit is realized by a combination of hardware and software will be specifically illustrated.

The encryption apparatus 2000 is implemented with one of various computers such as a personal computer (PC), a portable terminal, or a server machine. Here, the encryption apparatus 2000 may be implemented with a dedicated computer for implementing the encryption apparatus 2000, or may be implemented with a general-purpose computer having other applications or the like included therein.

Figure 5:
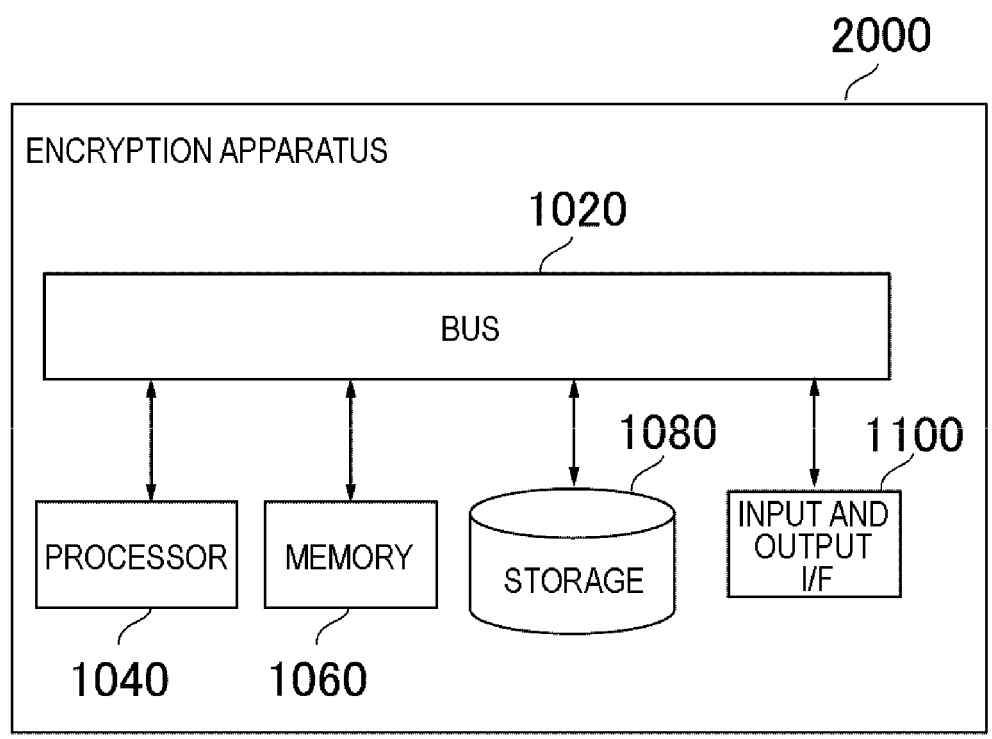
FIG. 5 is a block diagram illustrating a hardware configuration of the encryption apparatus.

FIG. 5 is a block diagram illustrating a hardware configuration of the encryption apparatus 2000. The encryption apparatus 2000 includes a bus 1020, a processor 1040, a memory 1060, a storage 1080, and an input and output interface 1100. The bus 1020 is a data transmission channel in order for the processor 1040, the memory 1060, the storage 1080, and the input and output interface 1100 to mutually transmit and receive data. However, a method of connecting the processor 1040 and the like to each other is not limited to a bus connection. The processor 1040 is an arithmetic processing apparatus such as, for example, a central processing unit (CPU) or a graphics processing unit (GPU). The memory 1060 is a memory such as, for example, a random access memory (RAM) or a read only memory (ROM). The storage 1080 is a storage apparatus such as, for example, a hard disk, a solid state drive (SSD), or a memory card. In addition, the storage 1080 may be a memory such as a RAM or a ROM. The input and output interface 1100 is an input and output interface in order for the encryption apparatus 2000 to transmit and receive data between an input and output device, an external apparatus, and the like.

The storage 1080 stores programs for realizing functions of the encryption apparatus 2000. Specifically, the storage stores program modules for realizing respective functions of the acquisition unit 2020, the second-cryptographic-key generation unit 2040, the third-cryptographic-key generation unit 2060, the counter mode encryption unit 2080, and the key block generation unit 2100. The processor 1040 executes these respective program modules, and thus realizes the respective functions of the acquisition unit 2020, the second-cryptographic-key generation unit 2040, the third-cryptographic-key generation unit 2060, the counter mode encryption unit 2080, and the key block generation unit 2100. Here, when the processor 1040 executes the respective modules, these modules may be read out on the memory 1060 and then be executed, and may be executed without being read out on the memory 1060.

The hardware configuration of the encryption apparatus 2000 is not limited to the configuration shown in FIG. 5. For example, each program module may be stored in the memory 1060. In this case, the encryption apparatus 2000 may not include the storage 1080.

<Advantageous Effects>

A method disclosed in Non-Patent Document 1 and a method disclosed in Non-Patent Document 2 will be described, and then advantageous effects of the encryption apparatus of the present exemplary embodiment will be described.

FIG. 6 is a diagram illustrating a ciphertext generation process EplsAenc( ) in Non-Patent Document 1, and FIG. 7 is a diagram illustrating a decryption process EplsAdec( ) in Non-Patent Document 1. On the other hand, FIG. 8 is a diagram illustrating a ciphertext generation process AONEenc( ) in Non-Patent Document 2, and FIG. 9 is a diagram illustrating a decryption process AONEdec( ) in Non-Patent Document 2. Note that Enc( ) in FIG. 7 is a function indicating any encryption process of encrypting a block. In addition, Dec( ) in FIG. 8 is a function indicating any decryption process of decrypting the block encrypted by Enc( ).

In the method of Non-Patent Document 2, the ciphertext generation process is realized with the smaller amount of calculation than that of the ciphertext generation process of Non-Patent Document 1. In the ciphertext generation process of Non-Patent Document 1, 2n+1 encryption processes (n times of EncCtr and n+1 times of Enc) and 2n exclusive OR operations are performed. On the other hand, in the ciphertext generation process of Non-Patent Document 2, n encryption processes (EncCtr) and 3n+1 exclusive OR operations are performed. Thus, the ciphertext generation process of Non-Patent Document 2 is smaller in the number of encryption processes and is larger in the number of exclusive OR operations than the ciphertext generation process of Non-Patent Document 1. Here, generally, the encryption process is larger in the amount of calculation than the exclusive OR operations. Therefore, the ciphertext generation process of Non-Patent Document 2 is smaller in the amount of calculation than the ciphertext generation process of Non-Patent Document 1.

However, in the method of Non-Patent Document 2, from the reasons shown below, the safety of a generated ciphertext is lower than the safety of a generated ciphertext in the method of Non-Patent Document 1. In the decryption process of Non-Patent Document 1 shown in FIG. 7, lack of even any one of the cryptographic blocks $[1], \ldots, y[n+1]$ causes k' not to be able to be calculated in the process of FIG. 7(1). Therefore, any of the plaintext blocks $x[1], \ldots, x[n]$ is not able to be calculated in the process of FIG. 7(3). Thus, in the method of Non-Patent Document 1, as long as all the blocks output in the ciphertext generation process are obtained, any of the plaintext blocks is not able to be decrypted.

On the other hand, in the decryption process of Non-Patent Document 2 shown in FIG. 9, when n blocks of n+1 cryptographic blocks are acquired, a portion of the plaintext can be decrypted. This is because y'[n+1] can be decrypted from the ciphertext of n blocks. In the method of Non-Patent Document 2, information for making the process of AONEenc( ) non-deterministic is the key k and y'[n+1]. Therefore, in a situation where the key k is available, only y'[n+1] serves as information for making the process of AONEenc( ) non-deterministic. Therefore, when y'[n+1] can be restored, the process of AONEenc( ) lacks the non-determinism.

For example, a malicious third party, who has acquired the ciphertext of n blocks and has restored y'[n+1] using them, executes the process of AONEenc( ) using this y' [n+1] and a plaintext block sequence $w[1], \ldots, w[n]$ of n blocks that is appropriately generated. This malicious third party compares the generated ciphertext and the acquired ciphertext. Here, when these texts are different from each other, it can be understood that "the plaintext is not $w[1], \ldots, w[n]$". The capability of speculating the contents of the plaintext in this manner means that the safety of the ciphertext is low.

According to the encryption apparatus 2000 of the present exemplary embodiment, the third cryptographic key, which is calculated as exclusive OR between the first cryptographic key and the second cryptographic key, is used as a cryptographic key to be used in the encryption process. Thus, when either one of the first cryptographic key and the second cryptographic key is secreted, even a portion of the plaintext is not able to be decrypted. In addition, the number of encryption processes is n similarly to the ciphertext generation process of Non-Patent Document 2, and is smaller in the amount of calculation than that in the method of Non-Patent Document 1.

Thus, according to encryption apparatus 2000 of the present exemplary embodiment, the ciphertext can be generated by a small amount of calculation while improving the safety of the block cryptography.

[Exemplary Embodiment 2]

Figure 10:
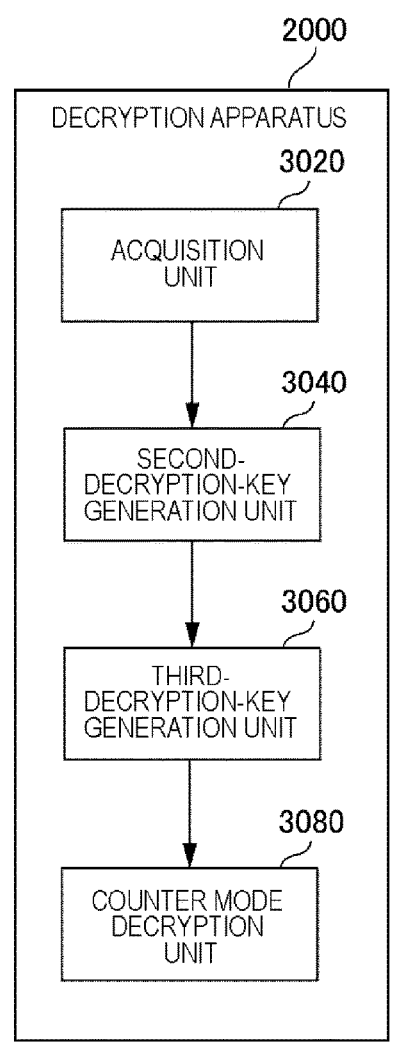
FIG. 10 is a block diagram illustrating a decryption apparatus according to Exemplary Embodiment 2.

FIG. 10 is a block diagram illustrating a decryption apparatus 3000 according to Exemplary Embodiment 2. In FIG. 10, arrows indicate a flow of information. Further, in FIG. 10, each block represents a function-based configuration rather than a hardware-based configuration.

The decryption apparatus 3000 decrypts a cryptographic block sequence to generate a plaintext block sequence. A cryptographic block sequence to be processed by the decryption apparatus 3000 is the cryptographic block sequence generated by the encryption apparatus 2000. For this reason, the decryption apparatus 3000 includes an acquisition unit 3020, a second-decryption-key generation unit 3040, a third-decryption-key generation unit 3060, and a counter mode decryption unit 3080.

The acquisition unit 3020 acquires a target block sequence and a first decryption key. The target block sequence has the key block and the cryptographic block sequence, which are described above. The cryptographic block sequence has a plurality of cryptographic blocks. The second-decryption-key generation unit 3040 generates a second decryption key. The second decryption key is generated as exclusive OR between respective cryptographic blocks included in the cryptographic block sequence. The third-decryption-key generation unit 3060 generates a third decryption key. The third decryption key is generated as exclusive OR between the first decryption key and the second decryption key. The counter mode decryption unit 3080 decrypts a cryptographic block to generate a plain text block sequence. Note that the counter mode decryption unit 3080 uses a counter mode as the block cipher mode of operation. In addition, the counter mode decryption unit 3080 uses the third decryption key as a decryption key.

FIG. 11 is a diagram illustrating a process executed by the decryption apparatus 3000 using mathematical expressions and the like. Hereinafter, the function of each functional configuration unit will be described with appropriate reference to FIG. 11. However, the process shown in FIG. 11 is merely illustrative, and the process executed by the decryption apparatus 3000 is not limited to the process shown in FIG. 11. In addition, in the example of FIG. 11, it is assumed that the key length L of the first decryption key is larger than the block length of the cryptographic block. However, the key length L of the first decryption key may be equal to or less than the block length of the cryptographic block.

<Details of Acquisition Unit 3020>

The cryptographic block sequence included in the target block sequence is a cryptographic block sequence generated by the counter mode encryption unit 2080 of the encryption apparatus 2000. In addition, the key block included in the target block sequence is a key block generated by the key block generation unit 2100 of the encryption apparatus 2000. That is, the target block is equivalent to an output block that is output by the output unit 2120. A process performed by the acquisition unit 3020 is represented by, for example, (1) of FIG. 11.

For example, the acquisition unit 3020 acquires the cryptographic block sequence and the key block that are stored in a storage device by the encryption apparatus 2000. In another example, the target block sequence is acquired by receiving the cryptographic block sequence and the key block that are transmitted by the encryption apparatus 2000. In another example, the acquisition unit 3020 may acquire the cryptographic block sequence and the key block that are manually input.

In addition, the first decryption key acquired by the acquisition unit 3020 is the same value as that of the first cryptographic key used when the encryption apparatus 2000 generates the cryptographic block sequence. The acquisition unit 3020 may acquire the first decryption key from the encryption apparatus 2000, may acquire the first decryption key being manually input, and may acquire the first decryption key stored in an internal or external storage device of the decryption apparatus 3000.

<Second-Decryption-Key Generation Unit 3040>

The second-decryption-key generation unit 3040 calculates exclusive OR between each block sequence of the cryptographic block sequence and the key block, and generates the second decryption key using the calculation result. For example, the process of the second-decryption-key generation unit 3040 is represented by (2) of FIG. 11. In (2) of FIG. 11, the second-decryption-key generation unit 3040 calculates exclusive OR of respective blocks of the target block sequence $\{y[1], \ldots, y[n+1]\}$, and handles the calculation result as the second decryption key kd2.

Figure 12:
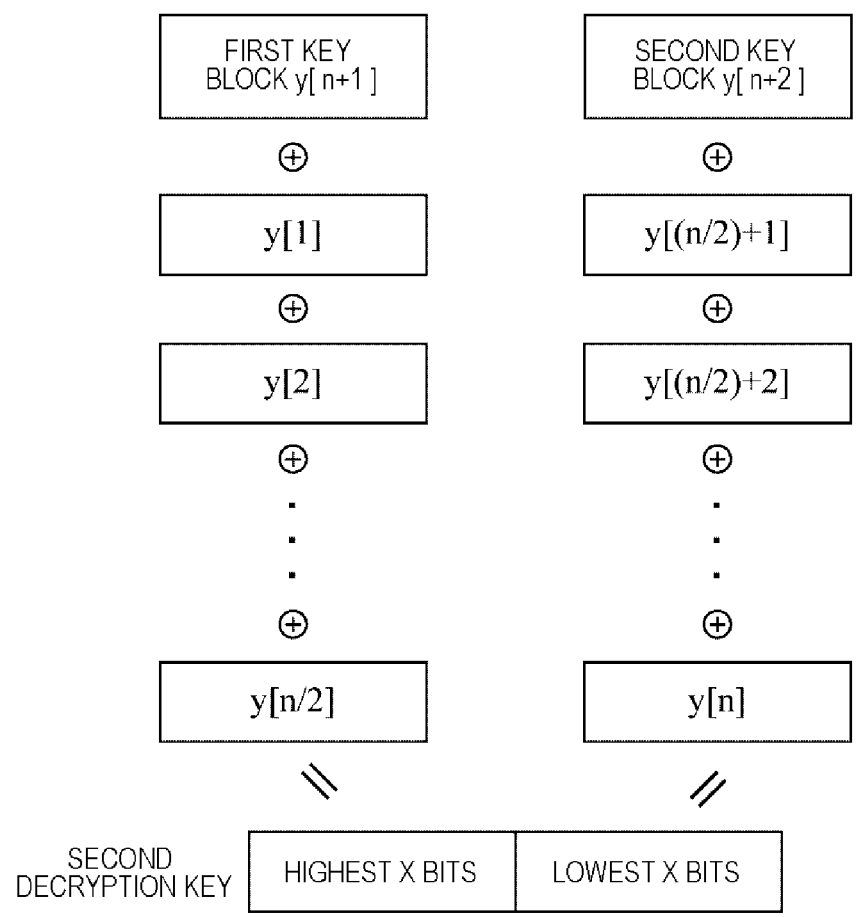
FIG. 12 is a diagram conceptually illustrating a process of generating a second decryption key from a plurality of key blocks.

Here, a plurality of key blocks may be included in the target block sequence. In this case, the second-decryption-key generation unit 3040 generates partial keys from the respective key block, and generates the second decryption key by coupling the partial keys. FIG. 12 is a diagram conceptually illustrating a process of generating the second decryption key from a plurality of key blocks. In FIG. 12, a first key block y[n+1] and a second key block y[n+2] are included in the target block.

The second-decryption-key generation unit 3040 generates a first partial key by calculating exclusive OR between respective blocks of $\{y[1], \ldots, y[n/2]\}$, which is a portion of the cryptographic block sequence, and the first key block y[n+1]. Next, the second-decryption-key generation unit 3040 generates a second partial key by calculating exclusive OR between respective blocks of $\{y[(n/2)+1], \ldots, y[n]\}$, which is a portion of the cryptographic block sequence, and the second key block y[n+2]. The second-decryption-key generation unit 3040 generates the second decryption key by coupling the first partial key with the second partial key.

Note that the second-decryption-key generation unit 3040 needs to recognize "which block within the respective blocks included in the cryptographic block sequence is to be used in an exclusive OR operation with which partial key". For example, in a case where m partial keys are acquired, the second-decryption-key generation unit 3040 is configured to divide the cryptographic block sequence into a plurality block sequences by equally dividing into m parts, and to use each block sequence in an exclusive OR operation with either one of partial keys. In addition, the second-decryption-key generation unit 3040 may acquire information indicating "which block within the respective blocks included in the cryptographic block sequence is used in an exclusive OR arithmetic operation with which partial key", together with the key block. The second-decryption-key generation unit 3040 may acquire this information which is output from the encryption apparatus 2000, may acquire this information being manually input, and may acquire this information stored in the internal or external storage device of the decryption apparatus 3000.

<Third-Decryption-Key Generation Unit 3060>

The third-decryption-key generation unit 3060 calculates exclusive OR between a portion or the entirety of the second decryption key and the first decryption key, and handles the calculation result as the third decryption key. In a case where the bit length of the second decryption key is larger than the bit length of the first decryption key, the third-decryption-key generation unit 3060 calculates exclusive OR between a portion of the second decryption key and the first decryption key, and handles the calculation result as the third decryption key. The processes of the third-decryption-key generation unit 3060 in this case are represented by, for example, (3) and (4) of FIG. 11. In FIG. 11, the bit length of the first decryption key is L. Therefore, in (3) of FIG. 11, the third-decryption-key generation unit 3060 generates a partial key k that is the lowest L bits of the second decryption key. In (4) of FIG. 11, the third-decryption-key generation unit 3060 calculates exclusive OR between the first decryption key kd1 and the partial key k, and handles the calculation result as the third decryption key kd3.

On the other hand, in a case where the bit length of the second decryption key is equal to or less than the bit length of the first decryption key, the third-decryption-key generation unit 3060 handles exclusive OR between the entirety of the second decryption key and the first decryption key as the third decryption key. In this case, the process of (3) of FIG. 11 is not required.

<Counter Mode Decryption Unit 3080>

The counter mode decryption unit 3080 decrypts the cryptographic block sequence using the counter mode, which is one of block cipher modes of operation, and generates a plaintext block. The counter mode decryption unit 3080 uses the above-described third decryption key as a decryption key. In addition, the counter mode decryption unit 3080 uses the cryptographic block sequence acquired by the acquisition unit 3020 as a cryptographic block sequence that is a target for decryption. Further, the counter mode decryption unit 3080 uses the same value as the initial value of the counter used in the generation of the cryptographic block sequence by the counter mode encryption unit 2080, as the initial value of a counter in the decryption process. The counter mode decryption unit 3080 may acquire the initial value of the counter from the encryption apparatus 2000, may acquire the initial value of the counter being manually input, or may acquire the initial value of the counter stored inside or outside the decryption apparatus 3000. In addition, the initial value of the counter may be set in the counter mode decryption unit 3080 in advance.

Note that, the method itself of performing the decryption process with the block cryptography of the counter mode using the input decryption key, the initial value of the counter, and the cryptographic block sequence is an existing technique. Therefore, the detailed description of this method will not be repeated.

A process performed by the counter mode decryption unit 3080 is represented by, for example, (5) of FIG. 11. Here, DecCtr(kd3; i; y[1], . . . , y[n]) indicates a "function of performing the decryption process with the block cryptography of the counter mode, using the decryption key kd3, the initial value i of the counter, and the cryptographic block sequence $\{y[1], \ldots, y[n]\}$ as an input". In (5) of FIG. 11, x[1], . . . , x[n] is generated as a plaintext block sequence.

<Output Unit 3100>

The decryption apparatus 3000 may further include an output unit 3100 (not shown). The output unit 3100 outputs the plaintext block decrypted by the counter mode decryption unit 3080 (for example, (6) of FIG. 11).

<Flow of Processes>

Figure 13:
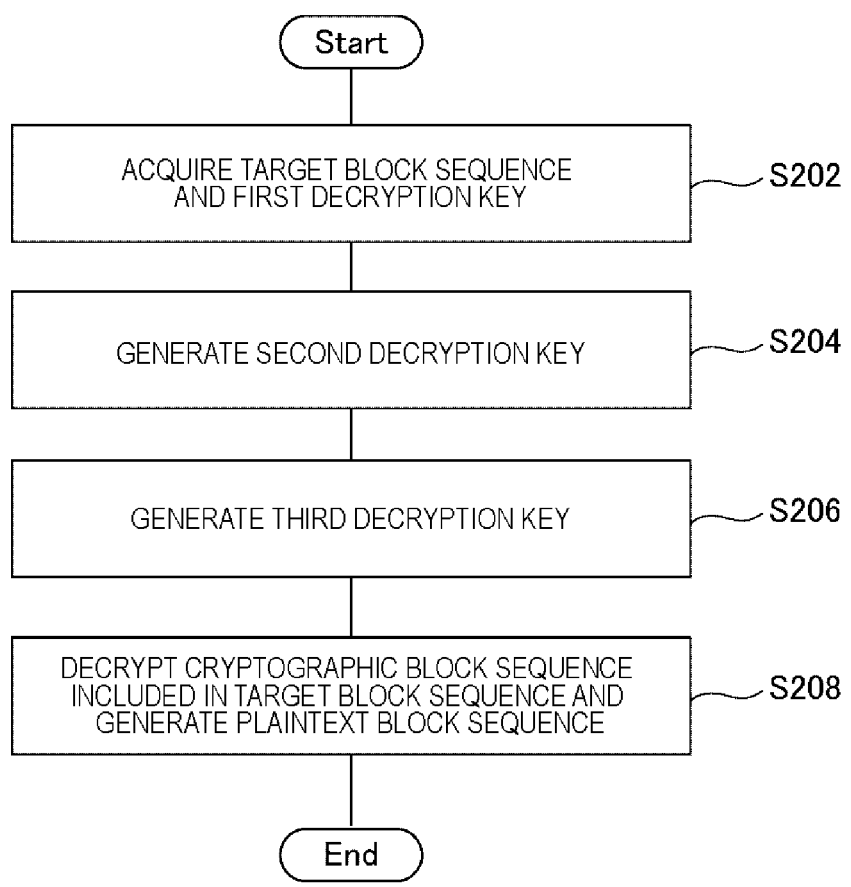
FIG. 13 is a flow diagram illustrating a flow of processes executed by the decryption apparatus of Exemplary Embodiment 2.

FIG. 13 is a flow diagram illustrating a flow of processes executed by the decryption apparatus 3000 of Exemplary Embodiment 2. The acquisition unit 3020 acquires the target block sequence and the first decryption key (S202). The second-decryption-key generation unit 3040 generates the second decryption key (S204). The third-decryption-key generation unit 3060 generates the third decryption key (S206). The counter mode decryption unit 3080 decrypts the cryptographic block sequence with the block cryptography of the counter mode, and generates the plaintext block sequence (S208).

<Hardware Configuration Example>

Each functional configuration unit of the decryption apparatus 3000 may be realized by hardware for realizing each functional configuration unit (such as, for example, a hardwired electronic circuit), and may be realized by a combination of hardware and software (such as, for example, combination of an electronic circuit and a program for controlling the electronic circuit). Hereinafter, configurations in a case where each functional configuration unit is realized by a combination of hardware and software will be specifically illustrated.

The decryption apparatus 3000 is implemented with one of various computers such as a personal computer (PC), a portable terminal, or a server machine. Here, the decryption apparatus 3000 may be implemented with a dedicated computer for implementing the decryption apparatus 3000, or may be implemented with a general-purpose computer having other applications included therein.

Figure 14:
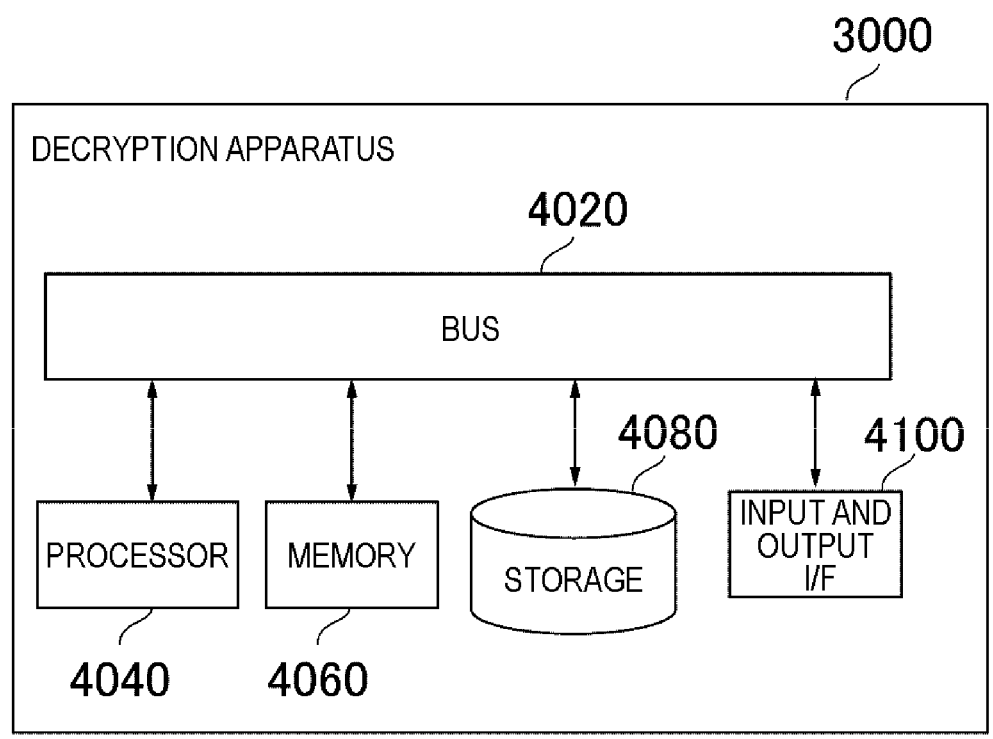
FIG. 14 is a block diagram illustrating a hardware configuration of the decryption apparatus.

FIG. 14 is a block diagram illustrating a hardware configuration of the decryption apparatus 3000. The decryption apparatus 3000 includes a bus 4020, a processor 4040, a memory 4060, a storage 4080, and an input and output interface 4100. Here, the bus 4020, the processor 4040, the memory 4060, the storage 4080, and the input and output interface 4100 have the same functions as those of the bus 1020, the processor 1040, the memory 1060, the storage 1080, and the input and output interface 1100 in the encryption apparatus 2000 of FIG. 5, respectively.

The storage 4080 stores programs for realizing functions of the decryption apparatus 3000. Specifically, the storage stores program modules for realizing respective functions of the acquisition unit 3020, the second-decryption-key generation unit 3040, the third-decryption-key generation unit 3060, and the counter mode decryption unit 3080. The processor 4040 executes these respective program modules, and thus realizes the respective functions of the acquisition unit 3020, the second-decryption-key generation unit 3040, the third-decryption-key generation unit 3060, and the counter mode decryption unit 3080. Here, when the processor 4040 executes the respective modules, these modules may be read out on the memory 4060 and then be executed, and may be execute without being read out on the memory 4060.

The hardware configuration of the decryption apparatus 3000 is not limited to the configuration shown in FIG. 14. For example, each program module may be stored in the memory 4060. In this case, the decryption apparatus 3000 may not include the storage 4080.

<Advantageous Effects>

According to the decryption apparatus 3000 of the present exemplary embodiment, it is possible to decrypt the cryptographic block sequence generated by the encryption apparatus 2000 of Exemplary Embodiment 1, and to obtain the plaintext block sequence.

[Exemplary Embodiment 3]

Figure 15:
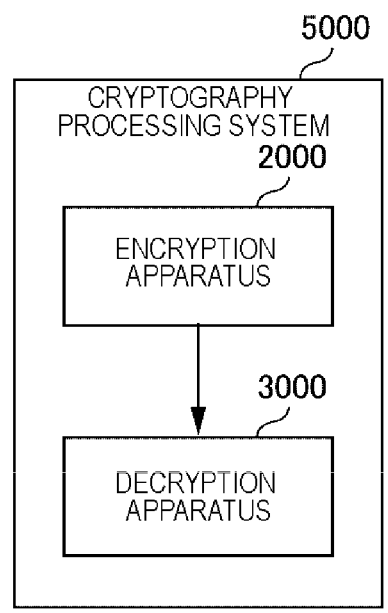
FIG. 15 is a block diagram illustrating a cryptography processing system according to Exemplary Embodiment 3.

FIG. 15 is a block diagram illustrating a cryptography processing system 5000 of Exemplary Embodiment 3. The cryptography processing system. 5000 includes the encryption apparatus 2000 of Exemplary Embodiment 1 and the decryption apparatus 3000 of Exemplary Embodiment 2. The configuration of the encryption apparatus 2000 is shown in, for example, FIG. 1. In addition, the configuration of the decryption apparatus 3000 is shown in, for example, FIG. 10. Therefore, in FIG. 15, each functional configuration unit included in the encryption apparatus 2000 and the decryption apparatus 3000 is not shown.

The decryption apparatus 3000 acquires a target block sequence constituted by the cryptographic block sequence and the key block generated by the encryption apparatus 2000, in any of the methods described in Exemplary Embodiment 2. According to the cryptography processing system 5000 of the present exemplary embodiment, it is possible to perform encryption and decryption in a method in which the safety is high and the amount of calculation is small.

As described above, although the exemplary embodiments of the present invention have been set forth with reference to the accompanying drawings, the exemplary embodiments are merely illustrative of the present invention, and a combination of the respective exemplary embodiments and various configurations other than those stated above can be adopted.

Hereinafter, examples of reference forms are appended.

1. An encryption apparatus including:

an acquisition unit acquiring a plaintext block sequence constituted by a plurality of plaintext blocks, and a first cryptographic key;

a second-cryptographic-key generation unit generating a second cryptographic key;

a third-cryptographic-key generation unit calculating a third cryptographic key as exclusive OR between the first cryptographic key and a portion or the entirety of the second cryptographic key;

a counter mode encryption unit encrypting the plaintext block sequence with a block cryptography of a counter mode in which the third cryptographic key is used as a cryptographic key, and generating a cryptographic block sequence; and a key block generation unit generating a key block by calculating exclusive OR between the second cryptographic key and respective blocks of the cryptographic block sequence.

2. The encryption apparatus according to 1, wherein in a case where a size of the second cryptographic key is larger than a size of the plaintext block, the key block generation unit generates n key blocks by calculating exclusive OR between respective ones of portions obtained by dividing the second cryptographic key into n parts (n≥2) and respective ones of partial blocks obtained by dividing the cryptographic block sequence into n parts.

3. The encryption apparatus according to 1 or 2, further comprising a block sequence output unit outputting a block sequence having the cryptographic block sequence and the key blocks.

4. A decryption apparatus including:

an acquisition unit acquiring a key block, a cryptographic block sequence having a plurality of cryptographic blocks, and a first decryption key;

a second-decryption-key generation unit calculating exclusive OR between respective cryptographic blocks included in the cryptographic block sequence, and generates a second decryption key using a result of the calculation;

a third-decryption-key generation unit calculating a third decryption key as exclusive OR between the first decryption key and a portion or the entirety of the second decryption key; and a counter mode decryption unit decrypting the cryptographic block sequence with a block cryptography of a counter mode in which the third decryption key is used as a decryption key, and generating a plaintext block sequence.

5. The decryption apparatus according to 4, wherein the acquisition unit acquires a plurality of key blocks, and the second-decryption-key generation unit calculates exclusive OR between respective ones of the key blocks and respective ones of partial blocks obtained by dividing the cryptographic block sequence into n parts (n>0), and generating the second decryption key by coupling a plurality of the calculated values.

6. A cryptography processing system including:
the encryption apparatus according to any one of 1 to 3; and
the decryption apparatus according to 4 or 5.

7. An encryption method which is executed by a computer, including:
an acquisition step of acquiring a plaintext block sequence constituted by a plurality of plaintext blocks, and a first cryptographic key;
a second-cryptographic-key generation step of generating a second cryptographic key;
a third-cryptographic-key generation step of calculating a third cryptographic key as exclusive OR between the first cryptographic key and a portion or the entirety of the second cryptographic key;
a counter mode encryption step of encrypting the plaintext block sequence with a block cryptography of a counter mode in which the third cryptographic key is used as a cryptographic key, and generating a cryptographic block sequence; and
a key block generation step of generating a key block by calculating exclusive OR between the second cryptographic key and respective blocks of the cryptographic block sequence.

8. The encryption method according to 7, wherein in a case where a size of the second cryptographic key is larger than a size of the plaintext block, the key block generation step includes generating n key blocks by calculating exclusive OR between respective ones of portions obtained by dividing the second cryptographic key into n parts (n≥2) and respective ones of partial blocks obtained by dividing the cryptographic block sequence into n parts.

9. The encryption method according to 7 or 8, further including a block sequence output step of outputting a block sequence having the cryptographic block sequence and the key block.

10. A decryption method which is executed by a computer, including:
an acquisition step of acquiring a key block, a cryptographic block sequence having a plurality of cryptographic blocks, and a first decryption key;
a second-decryption-key generation step of calculating exclusive OR between respective cryptographic blocks included in the cryptographic block sequence, and generating a second decryption key using a result of the calculation;
a third-decryption-key generation step of calculating a third decryption key as exclusive OR between the first decryption key and a portion or the entirety of the second decryption key; and a counter mode decryption step of decrypting the cryptographic block sequence with a block cryptography of a counter mode in which the third decryption key is used as a decryption key, and generating a plaintext block sequence.

11. The decryption method according to 10, wherein the acquisition step includes acquiring a plurality of key blocks, and the second-decryption-key generation step includes calculating exclusive OR between respective ones of key blocks and respective ones of partial blocks obtained by dividing the cryptographic block sequence into n parts (n>0), and generating the second decryption key by coupling a plurality of the calculated values.

12. An encryption program for causing a computer to have a function of operating as the encryption apparatus according to any one of 1 to 3.

13. A decryption program for causing a computer to have a function of operating as the decryption apparatus according to 4 or 5.

This application claims priority from Japanese Patent Application No. 2014-245932 filed on Dec. 4, 2014, the content of which is incorporated herein by reference in its entirety.

What is claimed is:
1. An encryption apparatus comprising:
an acquisition unit acquiring a plaintext block sequence constituted by a plurality of plaintext blocks, and a first cryptographic key;
a second-cryptographic-key generation unit generating a second cryptographic key;
a third-cryptographic-key generation unit calculating a third cryptographic key as exclusive OR between the first cryptographic key and a portion or the entirety of the second cryptographic key;
a counter mode encryption unit encrypting the plaintext block sequence with a block cryptography of a counter mode in which the third cryptographic key is used as a cryptographic key, and generating a cryptographic block sequence; and
a key block generation unit generating a key block by calculating exclusive OR between the second cryptographic key and respective blocks of the cryptographic block sequence.

2. The encryption apparatus according to claim 1, wherein in a case where a size of the second cryptographic key is larger than a size of the plaintext block, the key block generation unit generates n key blocks by calculating exclusive OR between respective ones of portions obtained by dividing the second cryptographic key into n parts (n>2, and n is an integer) and respective ones of partial blocks obtained by dividing the cryptographic block sequence into n parts.

3. The encryption apparatus according to claim 1, further comprising a block sequence output unit outputting a block sequence having the cryptographic block sequence and the key blocks.

4. A decryption apparatus comprising:
an acquisition unit acquiring a key block, a cryptographic block sequence having a plurality of cryptographic blocks, and a first decryption key;
a second-decryption-key generation unit calculating exclusive OR between respective cryptographic blocks included in the cryptographic block sequence, and generates a second decryption key using a result of the calculation;
a third-decryption-key generation unit calculating a third decryption key as exclusive OR between the first decryption key and a portion or the entirety of the second decryption key; and a counter mode decryption unit decrypting the cryptographic block sequence with a block cryptography of a counter mode in which the third decryption key is used as a decryption key, and generating a plaintext block sequence.

5. The decryption apparatus according to claim 4,
wherein the acquisition unit acquires a plurality of key blocks, and
wherein the second-decryption-key generation unit calculates exclusive OR between respective ones of the key blocks and respective ones of partial blocks obtained by dividing the cryptographic block sequence into n parts (n>0, and n is an integer), and generating the second decryption key by coupling a plurality of the calculated values.

6. A cryptography processing system comprising:
an encryption apparatus; and a decryption apparatus,
wherein the encryption apparatus comprises:
   an acquisition unit acquiring a plaintext block sequence constituted by a plurality of plaintext blocks, and a first cryptographic key;
   a second-cryptographic-key generation unit generating a second cryptographic key;
   a third-cryptographic-key generation unit calculating a third cryptographic key as exclusive OR between the first cryptographic key and a portion or the entirety of the second cryptographic key;
   a counter mode encryption unit encrypting the plaintext block sequence with a block cryptography of a counter mode in which the third cryptographic key is used as a cryptographic key, and generating a cryptographic block sequence; and
   a key block generation unit generating a key block by calculating exclusive OR between the second cryptographic key and respective blocks of the cryptographic block sequence, and
wherein the decryption apparatus comprises:
   an acquisition unit acquiring the generated key block, the generated cryptographic block sequence, and a first decryption key;
   a second-decryption-key generation unit calculating exclusive OR between respective cryptographic blocks included in the acquired cryptographic block sequence, and generates a second decryption key using a result of the calculation;
   a third-decryption-key generation unit calculating a third decryption key as exclusive OR between the first decryption key and a portion or the entirety of the second decryption key; and
   a counter mode decryption unit decrypting the acquired cryptographic block sequence with a block cryptography of a counter mode in which the third decryption key is used as a decryption key, and generating the plaintext block sequence.

7. An encryption method which is executed by a computer, comprising:
   acquiring a plaintext block sequence constituted by a plurality of plaintext blocks, and a first cryptographic key;
   generating a second cryptographic key;
   calculating a third cryptographic key as exclusive OR between the first cryptographic key and a portion or the entirety of the second cryptographic key;
   encrypting the plaintext block sequence with a block cryptography of a counter mode in which the third cryptographic key is used as a cryptographic key, and generating a cryptographic block sequence; and
   generating a key block by calculating exclusive OR between the second cryptographic key and respective blocks of the cryptographic block sequence,
   wherein said acquiring the plaintext block sequence, generating the second cryptographic key, calculating the third cryptographic key, encrypting the plaintext block sequence, and generating the key block are performed by the computer.

8. A decryption method which is executed by a computer, comprising:
   acquiring a key block, a cryptographic block sequence having a plurality of cryptographic blocks, and a first decryption key;
   calculating exclusive OR between respective cryptographic blocks included in the cryptographic block sequence, and generating a second decryption key using a result of the calculation;
   calculating a third decryption key as exclusive OR between the first decryption key and a portion or the entirety of the second decryption key; and
   decrypting the cryptographic block sequence with a block cryptography of a counter mode in which the third decryption key is used as a decryption key, and generating a plaintext block sequence,
   wherein said acquiring the key block, generating second decryption key, calculating the third decryption key, and decrypting the cryptographic block sequence are performed by the computer.

9. An encryption program, embodied on a non-transitory computer readable medium, for causing a computer to have a function of operating as the encryption apparatus according to claim 1.

10. A decryption program, embodied on a non-transitory computer readable medium, for causing a computer to have a function of operating as the decryption apparatus according to claim 4.

* * * * *